United States Patent [19]

Nakasuji

[11] Patent Number: 4,828,349
[45] Date of Patent: May 9, 1989

[54] MULTICORE OPTICAL FIBER

[75] Inventor: Masaaki Nakasuji, Kanagawa, Japan

[73] Assignee: Sumitomo Electric Industries, Ltd., Osaka, Japan

[21] Appl. No.: 81,443

[22] Filed: Aug. 4, 1987

[30] Foreign Application Priority Data

Aug. 5, 1986 [JP] Japan ............................ 61-120223[U]
Aug. 20, 1986 [JP] Japan ............................ 61-126584[U]

[51] Int. Cl.$^4$ ........................ B32B 9/00; G02B 6/00; G02B 6/22
[52] U.S. Cl. ............................ 350/96.33; 350/96.23; 350/96.34; 428/375; 428/378; 428/391
[58] Field of Search .............. 350/96.23, 96.33, 96.34; 428/375, 378, 391, 392

[56] References Cited

U.S. PATENT DOCUMENTS 4,346,145 8/1982 Choi et al. .......................... 428/375
4,592,955 6/1986 Choi et al. .......................... 428/375

FOREIGN PATENT DOCUMENTS 126506 7/1983 Japan ................. 350/96.23
154204 8/1985 Japan ................. 350/96.33
153014 8/1985 Japan ................. 350/96.23
54206 3/1987 Japan ................. 350/96.23

Primary Examiner—Lorraine T. Kendell
Attorney, Agent, or Firm—Cushman, Darby & Cushman

[57] ABSTRACT

A multicore optical fiber comprises a plurality of optical fiber elements disposed in parallel, each optical fiber element being equipped with a covering layer, a common covering layer integrally covering the plurality of optical fiber elements, and a peel layer provided on the outermost layer of each optical fiber element.

6 Claims, 3 Drawing Sheets

MULTICORE OPTICAL FIBER

BACKGROUND OF THE INVENTION

The present invention relates to a novel multicore optical fiber suitable for high density optical communications and more particularly to a multicore optical fiber such as a tape-shaped optical coated fiber equipped with a covering layer which is capable of effectively protecting each optical fiber element and is easy to handle when such optical fibers are coupled together.

With the recent advances in data communications, there has been a requirement for signal transmission at higher speed. As an example of materialization of such high speed signal transmission technology, the recent practical use of optical communications can be cited. The optical signal transmission has many advantages from the standpoint of communications in that the property of light itself is utilizable for realizing high speed transmission and that optical fibers used as transmission lines are lightweight and little affected by magnetic or electric fields. However, an optical fiber is still required which will increase the capacity of signal transmission and, there have been various kinds of optical fibers for signal transmission proposed.

A multicore optical fiber is one of the proposed optical fibers for such circumstances. The multicore optical fiber, which is formed by integrating fiber elements as optical waveguides with a covering layer common to them, is now spotlighted as being of realizing high density signal transmission with simple care in handling.

FIG. 1 is a sectional view showing the typical structure of a multicore optical fiber of the sort aforementioned, wherein glass fibers 1 for optical transmission respectively covered with covering layers 2 are further equipped with a common covering layer 3 to form a tape-shaped optical coated fiber.

In the prior art, the covering layers 2 and 3 are formed of, for example, ultravoilet-curing urethane acrylate.

When the multicore optical fiber is coupled to another member, e.g., an ordinary single core optical fiber or another multicore optical fiber, however, the form of a tape is difficult to handle and further the problem of transmission loss resulting from the connection of both also arises. In consequence, the common covering layer 3 must be removed to handle each element.

On the other hand, the glass fibers without the covering layer suffer from insufficient strength and may break. Thus, when each element is a handled, it is prerequisite to remove the common covering layer 3 of the multicore optical fiber in such a manner that the covering layer 2 of each element perfectly remains as it is and is also undamaged.

In the case of the conventional multicore optical fiber, however, the covering layers 2 and the common covering layer 3 are made of the same material. Even if they are not bonded chemically but bonded merely under pressure, it is not possible to remove only the common covering layer 3 while the covering layer of each optical fiber is left unremoved completely.

High degree of skill and many workhours have been required to couple multicore optical fibers.

Another known arrangement is to form a covering layer 2 of thermosetting silicone resin on each optical fiber 1 and then form a covering layer 3 of nylon common to the optical fibers, in order to provide a multicore optical fiber. The operation of removing the common covering layer 3 from the multicore optical fiber of that type is considerably easy because the covering layer 3 is relatively readily peeled off the covering layers 2.

However, because the mechanical strength of the thermosetting silicon resin used for the covering layer 2 of the optical fiber thus constructed is extremely low, the covering layer of each optical fiber element after the removal of the common covering layer can not withstand rubbing or scratching and are thus unsuitable for practical use.

The normal way of removing the common covering layer 3 of the conventional multicore optical fiber is, for instance, to vertically tear the common covering layer 3 into two pieces from both left- and right-hand ends A, A' with respect to the section shown in FIG. 1. However, the thickness of the common covering layer 3, excluding its portions respectively penetrating into the gaps between the optical fiber elements 1 and the covering layers 2, is practically uniform and therefore the common covering layer 3 will not readily be detached by simple pulling the halves thereof in certain directions. Even if it is attempted to tear the common covering layer into two pieces from cut points made in the edges thereof with a knife and the like, the common covering layer is not always torn in the longitudinal direction of the optical fiber. The removal of the common covering layer of the multicore optical fiber is indeed troublesome work.

SUMMARY OF THE INVENTION

An object of the present invention is to provide a multicore optical fiber, e.g., a tape-shaped optical coated fiber equipped with a common covering layer readily removable and covering layers capable of respectively effectively protecting optical fiber elements contained therein.

More specifically, the multicore optical fiber according to the present invention comprises a plurality of parallel optical fiber elements respectively equipped with covering layers, a common covering layer used for integrally covering the plurality of optical fiber elements, and a thin peel layer as the outermost layer of each optical fiber element for preventing both covering layers from adhering or pressure welding to each other.

Moreover, the multicore optical fiber according to the present invention is arranged so that the substantial thickness of the common covering layer is made small locally over the whole length of the optical fiber at symmetric positions with respect to the cross section thereof.

The novel multicore optical fiber according to the present invention has a peel layer provided as the outermost layer of each optical fiber constituting the multicore optical fiber, so that the common covering layer can readily be peeled from the covering layer of each optical fiber. Accordingly, the common covering layer can readily be removed from the covering layer of each optical fiber without damaging the latter.

Moreover, the peel layer sandwiched between each optical fiber and the common covering layer functions so as to prevent both from press welding to each other and each optical fiber can sufficiently maintain its property by the covering layer of each fiber element.

Furthermore, the multicore optical fiber prepared according to the present invention is provided with thin portions locally in the common layer. Accordingly, when the common covering layer is removed from the multicore optical fiber, if tensile force is applied in the direction perpendicular to a line connecting the thinned portions of the common covering layer, each optical fiber element is easily exposed since the common covering layer naturally tears from the thinned portions.

In view of the function of the common covering layer caused to be torn in its thinned portions first, the thinned portions may be located anywhere to attain the intended purpose as long as the common covering layer is halved with respect to the section. However, since the actual optical fiber is relatively as thin as several millimeters in the maximum dimension and, for better workability during the operation, the common covering layer should be preferably tore at both ends of the plane on which the optical fiber elements are disposed.

DETAILED DESCRIPTION OF THE PREFERRED EMBODIMENTS

Resin material for use in forming a covering layer on each single core optical fiber should be strong enough to protect the optical fiber and various materials conventionally used to form the protective layer of the optical fiber may be employed. Typical materials include thermoplastic resin such as nylon and ultraviolet-curing resin such as urethane acrylate.

As materials for use in forming a peel layer, use can be made of various resins having thermosetting or photo-setting properties such as ultraviolet-curing properties and easy moldability, and further properties which prevent its adherence and press-welding to a common covering layer or the covering layer of each optical fiber.

The material resins used as the peel layer include peeling agents prepared from ultraviolet-curing or thermosetting silicon resin, or ultraviolet-curing or thermosetting fluorocarbon resin. The silicon or fluorocarbon resin for use in the embodiment discussed herein is an organic compound containing silicon (Si) or fluorine (F) atoms in each molecule and can be hardened when exposed to heat or light, the hardened resin has excellent peel properties.

The peel layer is generally less than 20 μm and preferably less than 10 μm thick. The reason for this is that, because the peel layer does not protect protective function to the fiber element, it should preferably be as thin as possible. Also, if the peel layer is excessively thick, it will exert an unfavorable influence on the transmission characteristics of the fiber element and moreover may be damaged or peeled off as a result of friction or the like. The peel layer however should preferably be thick enough to separate the common covering layer from the covering layer of each optical fiber element.

With respect to the bond strength of the peel layer relative to an adjoining layer, i.e., the covering layer of each fiber element or common layer, it does not cause inconvenience whether one is greater than or equal to the other but the bond strength thereof relative to the former should preferably be, if anything, greater. The reason for this is attributed to the fact that, because the peel layer has to be destroyed for the removal of the common covering layer in case the peel layer clings to the common layer, undesirable stress acts on the element then. Also, part of the peel layer thus damaged is allowed to remain on the element side, which will necessitate the additional operation of removing the remnants of the peel layer from the element deprived of the common covering layer.

It should further be understood that the formation of multi-covering layers or peel layers are within the technical scope of the present invention.

Referring now to the accompanying drawings, a concrete description will be given to a multicore optical fiber embodying the present invention, which should not be construed as limiting the scope of the present invention.

Figure 1:
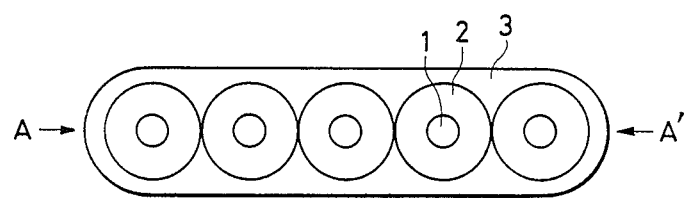
FIG. 1 is a sectional view showing the structure of a conventional multicore optical fiber.
Figure 2:
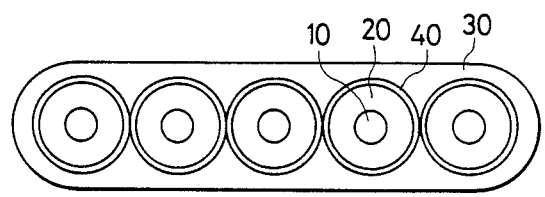
FIG. 2 is a sectional view showing the structure of a multicore optical fiber according to the first embodiment of the present invention.

FIG. 2 is a sectional view showing the construction of a multicore optical fiber according to the first embodiment of the present invention.

As shown in FIG. 2, a plurality of signal core optical fibers 10 are disposed in parallel on the same plane, each optical fiber being equipped with a covering layer 20, and incorporated in a covering layer 30 common to them in order to form a multicore optical fiber. An elliptic common covering layer may be used as is shown in FIG. 2. Each optical fiber 10 is equipped with a peel layer 40 on the outer periphery of the covering layer 20. The optical fiber elements are arranged so that the adjacent peel layers 40 make contact with each other.

The optical fiber 10 is a glass fiber with 125 μm diameter for optical transmission and the covering layer 20 is made of ultraviolet-curing urethane acrylate, so that a signal core optical fiber with 245 μm diameter is formed.

In one embodiment of optical fiber according to the present invention, the optical fiber 10 equipped with the covering layer 20 was further passed through a coating die filled with ultraviolet-curing peel layer material to form the peel layer 40. The die used had a hole diameter of 260 μm, whereas ultraviolet-curing silicone acrylate was used as the peel layer material. As for the ultraviolet curing, a 120 W/cm high pressure mercury vapor lamp was used to apply ultraviolet ray irradiation for about five second and an optical fiber element with 251 μm diameter equipped with the peel layer 40 was obtained.

Five optical fiber elements 10 respectively equipped with covering layers 20 and the peel layers 40 were arranged in parallel and incorporated in the common covering layer 30 to form a multicore optical fiber. The common covering layer 30 was formed by applying ultraviolet-curing urethane acrylate and providing ultraviolet ray irradiation.

The common covering layer 30 of the multicore optical fiber thus constructed could be removed easily by tearing the left- and right-hand ends of the section shown in FIG. 2 and the covering layer free from damage and having sufficient protective strength was left on each optical fiber element deprived of the common covering layer.

Figure 3A:
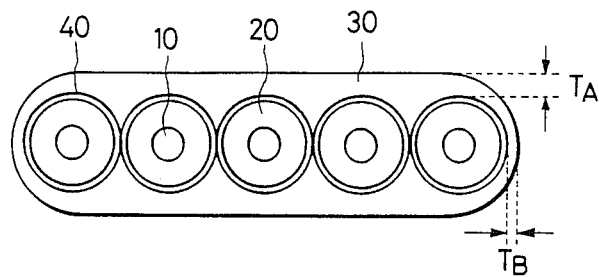
FIGS. 3(a) and 3(b) are sectional views showing the structure of multicore optical fibers according to the second embodiment of the present invention.

FIG. 3(a) is a sectional view showing the structure of a multicore optical fiber according to the second embodiment of the present invention, wherein like reference characters designate like parts of FIG. 2. The optical fiber in this embodiment was formed of the same material and through the same process as in the case of the multicore optical fiber shown in FIG. 2, except that the upper and lower thickness $T_A$ of the common covering 30 was 0.05 mm, whereas the thickness $T_B$ at the left- and right-hand ends was 0.03 mm.

In the multicore optical fiber thus constructed, since the peel layer 40 is sandwiched between the protective covering layer 20 of each optical fiber element and the common covering layer 30, both were prevented from adhering or press-welding to each other and the removal of the common covering layer 30 was easy. Moreover, the complete protective layer free from defects was left on each optical fiber deprived of the common covering layer.

Figure 3B:
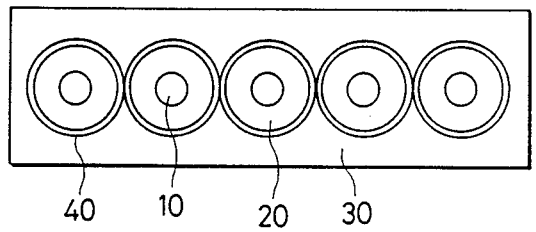

FIG. 3(b) shows another modification, wherein the sectional shape of the common covering layer 30 was made rectangular, and wherein the thickness of a portion forming a face perpendicular to the direction in which the inner optical fiber elements were disposed was made substantially thinner than a portion forming a face parallel to the direction in which the inner optical fiber elements were disposed.

Figure 4A:
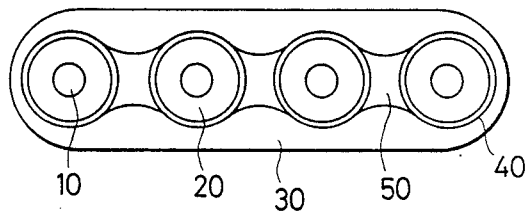
FIGS. 4(a), 4(b) and 4(c) are sectional views showing the structure of other modified multicore optical fibers according to the second embodiment of the present invention.
Figure 4B:
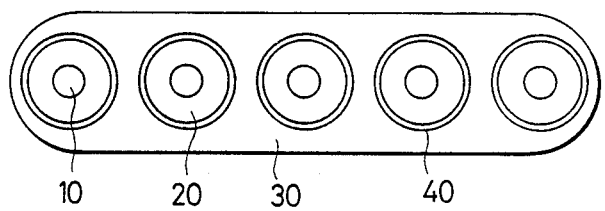
Figure 4C:
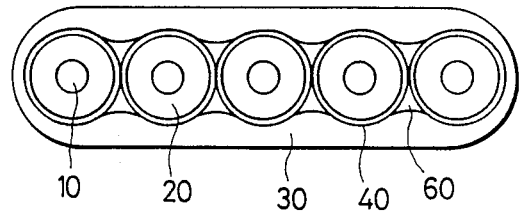

Although FIGS. 3(a) and 3(b) shows the multicore optical fibers with the adjoining optical fiber elements in contact with each other, the present invention is applicable to any multicore optical fiber having the common covering layer. More specifically, if the common covering layer 30 is discontinuous at the gap 50 as shown in FIG. 4(a) or even if it is continuous between the optical fiber elements but sufficiently thin as shown in Fib. 4(b), it can readily be separated and removed. Further, as shown in FIG. 4(c), the gap 60 may be formed in portions between the optical fiber element 10 and the common covering layer 30.

As set forth above, the multicore optical fiber according to the present invention is supplied with the peel layer for preventing the covering layer provided for each optical fibers and the common covering layer for integrating the optical fibers to form the multicore optical fiber from press-welding or adhering to each other. Accordingly, even though the common covering layer is removed for connecting purposes, the complete covering layer on each optical fiber is allowed to remain, and the connecting operation can be conducted easily for a short time.

Moreover, the multicore optical fiber according to the present invention is equipped with the peel layer and the common covering layer, a part of which is made substantially thin. Accordingly, even though the common covering layer is removed for connecting purposes, the complete covering layer on each optical fiber is allowed to remain, and the connecting operation can be conducted easily for a short time.

Consequently, it becomes possible to enlarge the applicability of the multicore optical fiber having numerous merits and such a demerit that a high degree of skill is required for handling. That is, the range of applications of optical communication technology and consequently the practicability of a large volume of data transmission can be further advanced according to the present invention.

What is claimed is:

1. A multicore optical fiber, comprising:
   a plurality of optical fiber elements disposed in parallel, each optical fiber element being equipped with a covering layer which is comprised of thermosetting resin, thermoplastic resin or ultraviolet curing resin;
   a peel layer comprised of ultraviolet curing of thermosetting fluorcarbon resin or ultraviolet curing of thermosetting silicone resin provided on the covering layer of each optical fiber element, the peel layer being thin enough so as not to affect the transmission characteristics of the optical fiber element and being capable of being removed without damaging the covering layers; and
   a protective common covering layer integrally covering the plurality of optical fiber elements, the common covering layer being comprised of ultraviolet-curing resin and being capable of being removed without damaging the peel layer.

2. A multicore optical fiber as claimed in claim 1, wherein a substantial thickness of the common covering layer is locally reduced at symmetrical positions with respect to the cross section of the multicore optical fiber over the whole length thereof.

3. A multicore optical fiber as claimed in claim 2, wherein a sectional shape of the common covering layer is an ellipse having a pair of sides included in a plane parallel to the plane on which the optical fiber elements are disposed and two end portions connecting the sides, the thickness of both end portions of the common covering layer are substantially thinner than the thickness of the two sides.

4. A multicore optical fiber as claimed in claim 2, wherein the common covering layer has a rectangular sectional shape and the thickness of the sides forming a plane perpendicular to the direction in which the optical fiber elements are disposed is substantially thinner than the sides forming the plane parallel to the plane on which the optical fiber elements are disposed.

5. A multicore optical fiber as claimed in claim 1, 2, 3 or 4, wherein the thickness of said peel layer is 20 μm or less.

6. A multicore optical fiber, comprising:
   a plurality of optical fiber elements disposed in parallel, each optical fiber element being equipped with a covering layer which is comprised of thermoplastic resin or ultraviolet curing resin;
   a peel layer comprised of ultraviolet curing or thermosetting fluorocarbon resin or ultraviolet curing or thermosetting silicone resin, said peel layer provided on the covering layer of each optical fiber element, the peel layer having a thickness of less than 20 μm; and
   a protective common covering layer integrally covering the plurality of optical fiber elements, the common covering layer being comprised of ultraviolet-curing resin and being capable of being removed without damaging the peel layer.

* * * * *